(12) United States Patent
Dixit et al.

(10) Patent No.: US 11,274,927 B2
(45) Date of Patent: Mar. 15, 2022

(54) SYSTEM AND METHOD FOR IDENTIFYING PASSIVE OPTICAL IDENTIFIER TAGS

(71) Applicant: Indian Institute of Technology Delhi, New Delhi (IN)

(72) Inventors: Abhishek Dixit, New Delhi (IN); Rishu Raj, New Delhi (IN); Karan Saxena, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 249 days.

(21) Appl. No.: 16/727,499

(22) Filed: Dec. 26, 2019

(65) Prior Publication Data

US 2020/0208988 A1    Jul. 2, 2020

(30) Foreign Application Priority Data

Dec. 29, 2018    (IN) .............................. 201811049799

(51) Int. Cl.
*G01C 21/20* (2006.01)
*G06K 7/10* (2006.01)

(52) U.S. Cl.
CPC ....... *G01C 21/206* (2013.01); *G06K 7/10544* (2013.01)

(58) Field of Classification Search
CPC ............. G01C 21/206; G06K 7/10544; G06K 19/06009; G01S 7/4818; G01S 17/46
See application file for complete search history.

(56) References Cited

U.S. PATENT DOCUMENTS 6,542,083 B1 *  4/2003  Richley ..................... G01S 5/16
                                                       340/10.42
10,003,401 B2 *  6/2018  Ryan ....................... H04L 67/12

FOREIGN PATENT DOCUMENTS

WO    WO-2019133012 A1 *  7/2019  ......... H04Q 11/0001

* cited by examiner

*Primary Examiner* — Mischita L Henson
(74) *Attorney, Agent, or Firm* — Meunier Carlin & Curfman LLC

(57) ABSTRACT

One or more systems and methods for identifying one or more passive optical identifier tag from a plurality of passive optical identifier tags is provided. The method includes emitting light from a light source device. Further, the method includes transmitting, by said plurality of passive optical identifier tags, reflected light to a receiver. The method further includes reflecting, by the plurality of passive optical identifier tags, the emitted light with its unique set of wavelengths, said set of wavelengths being inferred by the corresponding reflection sequence.

30 Claims, 13 Drawing Sheets

| $b_w$ | $b_{w-1}$ | .... | $b_i$ | .... | $b_2$ | $b_1$ |

100
SYSTEM AND METHOD FOR IDENTIFYING PASSIVE OPTICAL IDENTIFIER TAGS

CROSS REFERENCE TO RELATED PATENT APPLICATION

This application claims priority to and benefit of India Patent Application No. 2018011049799 filed Dec. 29, 2018, the entire contents of which is hereby incorporated by reference.

TECHNICAL FIELD

The present invention relates to a visible light communication system, more particularly to a system and method for identification of targets using visible light communication in indoor environment.

BACKGROUND

Indoor positioning relates to systems and methods whereby the locations of mobile devices and their users within a space are estimated. Such conventional indoor positioning systems (IPS) uses wireless signals to enable localization of the mobile and stationary devices, preferably in spaces like a retail store, inventory, libraries, airport terminals, conventional floors. Some examples of such technologies are Bluetooth, ZigBee, radio frequency identification (RFID), and wireless fidelity (Wi-Fi). At the same time, visible light communication (VLC), which utilizes white light LEDs for illumination as well as communication, has emerged as a promising technology for optical wireless communications. It offers numerous advantages including unlicensed spectrum, high energy efficiency, high security, low cost, low electromagnetic interference etc. over conventional wireless technologies.

Besides the inherent advantages of VLC, there are some other merits of VLC-based IPS technologies. Firstly, the conventional VLC based IPS benefits from higher accuracy due to large number of LED transmitters installed for illumination. In a typical indoor environment, the number of LED is ten times more than the number of Wi-Fi access points. Moreover, the IPS using visible light signals can be safely used in the areas where the use of RF is prohibited like hospitals and air crafts.

The conventional techniques for VLC-based indoor positioning use different algorithms like time of arrival, time difference of arrival (TDOA), received signal strengths (RSS) and angle of arrival (AOA). However, these conventional VLC-based indoor positioning techniques employ active devices like detectors and sensors at the user terminals. These devices require electrical power for operation and therefore suffer from several drawbacks including high cost, high energy consumption, and high complexity. Moreover, these conventional VLC-based indoor positioning systems perform receiver side information processing and localization for mobile users. Hence, the conventional existing systems use costly active devices on the floor and cheap sensors on the ceiling for estimation of the objects in an indoor environment. This increases cost and complexity because the devices on the ground are mobile, numerous and have a smaller lifetime. Furthermore, most of these devices are based on fragile mobile devices using the ever-evolving technology which needs to be updated and re-configured quite often.

Therefore, there is a need for VLC based indoor positioning system and method for localization of targets using visible light in a cost-effective and more efficient manner.

SUMMARY

This summary is provided to introduce concept related to a visible light communication (VLC) based indoor positioning system and method thereof. This summary is neither intended to identify essential features of the present invention nor is it intended for use in determining or limiting the scope of the present invention.

For example, various embodiments herein may include one or more systems and methods for identification of passive optical identifier tags which are installed on targets. In one embodiment, the system includes a light source device configured to emit light in an associated environment. Further, the system includes a plurality of passive optical identifier tags acting as a transmitter configured to transmit a reflected light. Each passive optical identifier tag reflects light at a unique set of wavelengths inferred by a corresponding reflection sequence. The system further includes a receiver configured to receive the reflected light, said receiver further comprises of a single array of photodiodes. The array of photodiodes is configured to receive a laser power and the reflected visible light at one or more pre-configured wavelengths at the same time. The photodiodes capture the visible light signals, reflected from the passive optical identifier tags installed on the corresponding targets. At each of the reflected wavelengths, the photodiodes capture a power profile called as color snap at that particular wavelength. Peak determines location of that target while the wavelength (at which the color snap is obtained) is used to distinguish one target from the plurality of targets. Further, the system includes a tunable laser device configured to transmit the laser power at one or more preconfigured wavelengths towards the array of photodiodes.

The system further includes a processing system coupled with the receiver, the processing system comprises a memory, a processor coupled to the memory, and one or more modules. The modules include an analyzer module and an identification module. Further, the analyzer module is configured to analyze the wavelengths and the respective power profiles of the reflected light. The identification module is configured to identify position and identification of the one or more passive optical identifier tag from the plurality of passive optical identifier tags. The position of the passive optical identifier tags is determined by the power peaks present in each of the power profiles, using the concept of basic positioning principle. Identification of the passive optical identifier tags is achieved by generating the reflection sequence, said reflection sequence is obtained by analyzing the position of the one or more passive optical identifier tag in the different power profiles.

In another embodiment, the method for identifying the one or more passive optical identifier tag from the plurality of passive optical identifier tags is provided. The method includes emitting light from a light source device. Further, the method includes transmitting, by said plurality of passive optical identifier tags, reflected light to a receiver. The method further includes reflecting, by the plurality of passive optical identifier tags, the emitted light with its unique set of wavelengths, said set of wavelengths being inferred by the corresponding reflection sequence.

The method further includes receiving, by the receiver, said reflected light at pre-configured one or more wavelengths along with their respective power profiles of the said light source. Further, the method includes analyzing, by analyzer module, the one or more wavelengths and the respective power profiles of the received light source. The method also includes identifying, by identification module, the position and identification of the one or more passive optical identifier tag from the plurality of passive optical identifier tags. The positioning of the one or more passive optical identifier tags is determined by power peaks present in each power profile using conventional basic positioning principle that employs a simple peak detection method. Further, identification of the passive optical identifier tags is achieved by generating a reflection sequence. The reflection sequence is obtained by analyzing the position of the one or more optical identifier tag in different power profiles.

BRIEF DESCRIPTION OF ACCOMPANYING DRAWINGS

The detailed description is described with reference to the accompanying figures. In the figures, the left-most digit(s) of a reference number identifies the figure in which the reference number first appears. The same numbers are used throughout the drawings to reference like features and modules.

DETAILED DESCRIPTION

Figure 1:
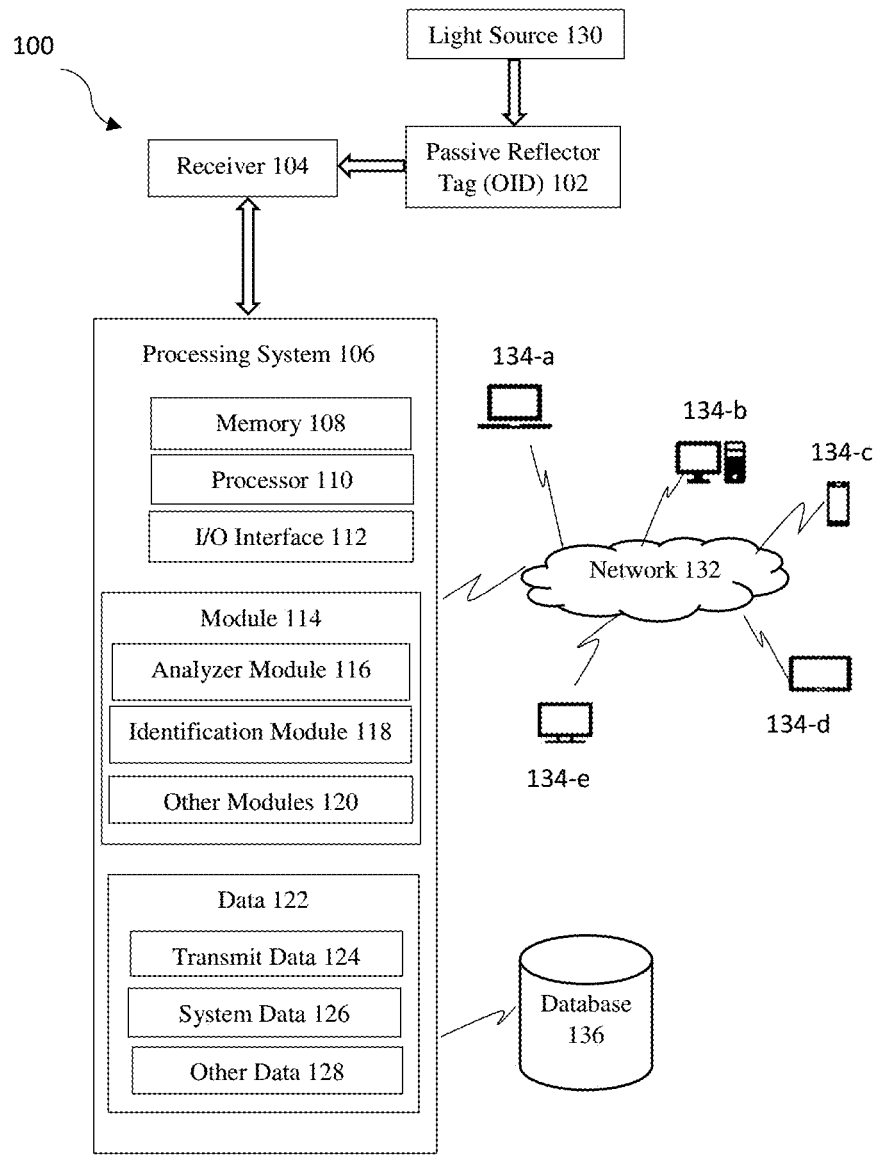
FIG. 1 illustrates a block diagram depicting a processing system connected to computing devices through a network, according to an exemplary implementation of the present invention.

In the following description, for the purpose of explanation, specific details are set forth in order to provide an understanding of the present invention. It will be apparent, however, to one skilled in the art that the present invention may be practiced without these details. One skilled in the art will recognize that embodiments of the present invention, some of which are described below, may be incorporated into several systems.

The various embodiments of the present invention provide a system and a method of positioning of passive optical identifier tags from the plurality of passive optical identifier tags in an environment.

Furthermore, connections between components and/or modules within the figures are not intended to be limited to direct connections. Rather, these components and modules may be modified, re-formatted or otherwise changed by intermediary components and modules.

References in the present invention to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

In an embodiment, the claimed subject matter of the present invention discloses a computer-implemented system for identifying a one or more passive optical identifier (OID) tag from plurality of passive optical identifier tags in an environment using an optical identification algorithm. A light source device is configured to emit light towards the OID tags in an associated environment. The light source can be considered as any light emitting device that emits visible light. For example, white LED is used as a light source device for emitting light.

In another embodiment, the present invention discloses the plurality of OID tags configured to transmit the reflected light. The OID tags are installed on targets where each tag acts is a passive transmitter. Each of OID tags consists of a unique combination of optical reflectors. By reflecting visible light signals, the one or more OID tag is used to detect, locate and identify the target on which it is installed. The one or more OID tag is used throughout in the description that helps to understand the working of the present invention easily.

In another embodiment, the system includes a receiver configured to receive the reflected light at pre-configured one or more wavelengths. The receiver further comprising an optical fiber to pass laser power, power splitters to divide and distribute the laser power, an array of photodiodes to receive the reflected light and the laser power, and an array of low pass filters to filter out the high frequency components and feed the output signals to a processor.

The array of photodiodes captures the light reflected from the OID tags installed on the targets that are to be positioned. At each reflected wavelength, the photodiode array captures a power profile at that particular wavelength. This power profile is named as a color snap at that particular wavelength. The color snap term is used in description wherever it is necessary to understand the working of the invention easily. The peak determines location of the one or more OID tag, while the wavelength (at which the color snap is obtained) is used to distinguish the one or more OID tag from a plurality of the OID tags. When visible light from the light source falls on the OID tags, each of the one or more OID tag reflects back a unique set of wavelengths which is governed by its reflection sequence. The set of wavelengths to which the OID tag responds depends on the combinational arrangement of gratings being used. The combination is unique and hence each of the one or more OID tag has its own unique set of wavelengths which it reflects. The characteristic wavelengths to which the one or more OID tag responds is inferred from its corresponding reflection sequence.

In one another embodiment, the present invention includes a processing system coupled with the receiver, the processing system includes a memory, a processor coupled to the memory, and one or more modules. The modules include an analyzer module and an identification module. The analyzer module is configured to analyze the wavelengths and the respective power profiles of the light source. Further, the identification module is configured to identify the position and identification of the one or more OID tag from the plurality of OID tags. The position is identified by the power peaks in the power profiles, whereas identification of the one or more OID tag from the plurality of OID tags is obtained by generating the reflection sequence. The reflection sequence is obtained by analyzing the position of the one or more OID tag in the different power profiles.

In another embodiment, the present invention discloses a computer-implemented method for identifying the one or more OID tag from the plurality of OID tags based on optical identification algorithm. The method includes emitting light from the light source device in an associated environment. Further, the method includes transmitting, by the plurality of OID tags, reflected light to the receiver. The reflected light is transmitted at unique set of wavelengths being inferred by the corresponding reflection sequence. The characteristic wavelengths to which the one or more OID tag responds is inferred by the corresponding reflection sequence. The reflection sequence of the one or more OID tag is a w-bit binary word, where w is the number of wavelengths used for positioning of the targets. The method further includes receiving, by the receiver, said reflected light at pre-configured one or more wavelengths along with their respective power profiles.

In another embodiment, the method further includes, capturing, by the array of photodiodes, the reflected light transmitted by the OID tags. At each reflected wavelength, each photodiode (PD) captures the power profile at that particular wavelength. The peak determines the location of the one or more OID tag while the wavelength (at which the power profile is obtained) is used to distinguish one OID tag from the other. The receiver is configured such that the PDs effectively sense only one wavelength at a particular time instant.

In another embodiment, the method further includes, emitting the laser power, by the laser device towards the single array of photodiodes. The laser is tuned in a cyclic and periodic manner for emitting the power signal at one or more pre-configured wavelengths. The photodiodes receiving the reflected light (along with their power profiles) and the laser power at one or more pre-configured wavelengths.

In another embodiment, the method includes analyzing, by the analyzer module, the one or more wavelengths and the respective power profiles of received reflected light. Furthermore, the method includes identifying, by the identifier module, the position and identification of the one or more OID tag from a plurality of the OID tags. The position of the OID tags is based on the determination of the power peaks in the power profiles, whereas identification of the one or more OID tag from the plurality of the passive OID tags is identified by the corresponding reflection sequence. The reflection sequence is obtained by analyzing the position of the one or more OID tag in different power profiles.

It should be noted that the description merely illustrates the principles of the present invention. It will thus be appreciated that those skilled in the art will be able to devise various arrangements that, although not explicitly described herein, embody the principles of the present invention. Furthermore, all examples recited herein are principally intended expressly to be only for explanatory purposes to help the reader in understanding the principles of the invention and the concepts contributed by the inventor to furthering the art and are to be construed as being without limitation to such specifically recited examples and conditions. Moreover, all statements herein reciting principles, aspects, and embodiments of the invention, as well as specific examples thereof, are intended to encompass equivalents thereof.

FIG. 1 illustrates an exemplary block diagram 100 depicting an identification of a one or more passive optical identifier tag (102) from plurality of passive optical identifier tags in an associated environment, according to an exemplary implementation of the present invention. The block diagram (100) is typically implemented in a computing environment. The block diagram (100) includes a light source (130), a passive reflector OID tag (102), a receiver (104), a processing system (106), a memory (108), a processor (110), an I/O interface (112), a module (114), data (122), a network (132), a plurality of computing devices 134 (134-a, 134-b, 134-c, 134-d, 134-e), and a database (136).

The network (132) interconnects the computing devices (134) and the database (136) with the processing system (106). The network (132) includes wired and wireless networks. Examples of the wired networks include a wide area network (WAN) or a local area network (LAN), a client-server network, a peer-to-peer network, and so forth. Examples of the wireless networks include Wi-Fi, a global system for mobile communications (GSM) network, a general packet radio service (GPRS) network, an enhanced data GSM environment (EDGE) network, 802.5 communication networks, code division multiple access (CDMA) networks, or Bluetooth networks.

In the present implementation, the database (136) may be implemented as an enterprise database, a remote database, local database, and the like. The database (136) may be located within the vicinity of the processing system (106) or may be located at different geographic locations as compared to that of the processing system (106). Further, the database (136) may themselves be located either within the vicinity of each other or may be located at different geographic locations. Furthermore, the database (136) may be implemented inside the processing system (106) or the database (136) may be implemented as a single database or a separate unit.

In the present implementation, the processing system (106) includes one or more processors (110). The processor (110) may be implemented as one or more microprocessors, microcomputers, microcontrollers, digital signal processors, central processing units, state machines, logic circuitries, and/or any devices that manipulate signals based on operational instructions. Among other capabilities, at least one processor (110) is configured to fetch and execute computer-readable instructions stored in the memory (108).

The I/O interface (112) may include a variety of software and hardware interfaces, for example, a web interface, a graphical user interface, and the like. The I/O interface (112) may allow the processing system (106) to interact with a user directly or through the user computing devices (134). Further, the I/O interface (112) may enable the processing system (106) to communicate with other user devices or computing devices (134), such as web servers and external data servers (not shown). The I/O interface (112) can facilitate multiple communications within a wide variety of networks and protocol types, including wired networks, for example, LAN, cable, etc., and wireless networks, such as WLAN, cellular, or satellite. The I/O interface (112) may include one or more ports for connecting a number of devices to one another or to another server.

The memory (108) may be coupled to the processor (110). The memory (108) can include any computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory (108) also includes a cache memory to work with the processing system (106) more effectively.

Further, the processing system (106) includes the modules (114). The modules (114) include routines, programs, objects, components, data structures, etc., which perform tasks or implement particular abstract data types. In one implementation, the module (114) includes an analyzer module (116), an identification module (118), and other modules (120). The other modules (120) may include programs or coded instructions that supplement applications and functions of the processing system (106).

Furthermore, in the present implementation, the system includes the analyzer module (116) which is configured to analyze the wavelengths and the respective power profiles of the light source (130). Further, the system includes the identification module (118) which is configured to identify the position and identification of the one or more OID tag (102) from a plurality of OID tags. Positioning of the OID tags is obtained by identification of the power peaks present in each of the power profiles, using basic positioning principle. Further, identification of the OID tag (102) from the plurality of OID tags is obtained by generating a reflection sequence. The reflection sequence can be obtained by analyzing the position of the one or more OID tag (102) in different power profiles.

In another implementation, the data (122) may include various data pertaining to the operation of the processor (110), and other data (128). The data (122), amongst other things, may serve as a repository for storing data that is processed, received, or generated as a result of the execution of one or more modules in the other module(s) (120). Although the data (122) is shown internal to the processing system (106), it may be understood that the data (122) can reside in an external repository or the database (136), which may be coupled to the processing system (106). Further, the data (122) broadly includes transmit data (124), system data (126), and other data (128). The transmit data (124) includes all the data pertaining to the identification process of the processing system (106). The system data (126) includes all other data except the transmitted data (124). The transmitted data (124) and the system data (126), both may be stored in the database (136). The other data (128) may include data generated as a result of the execution of one or more modules in the other modules (120).

Figure 2:
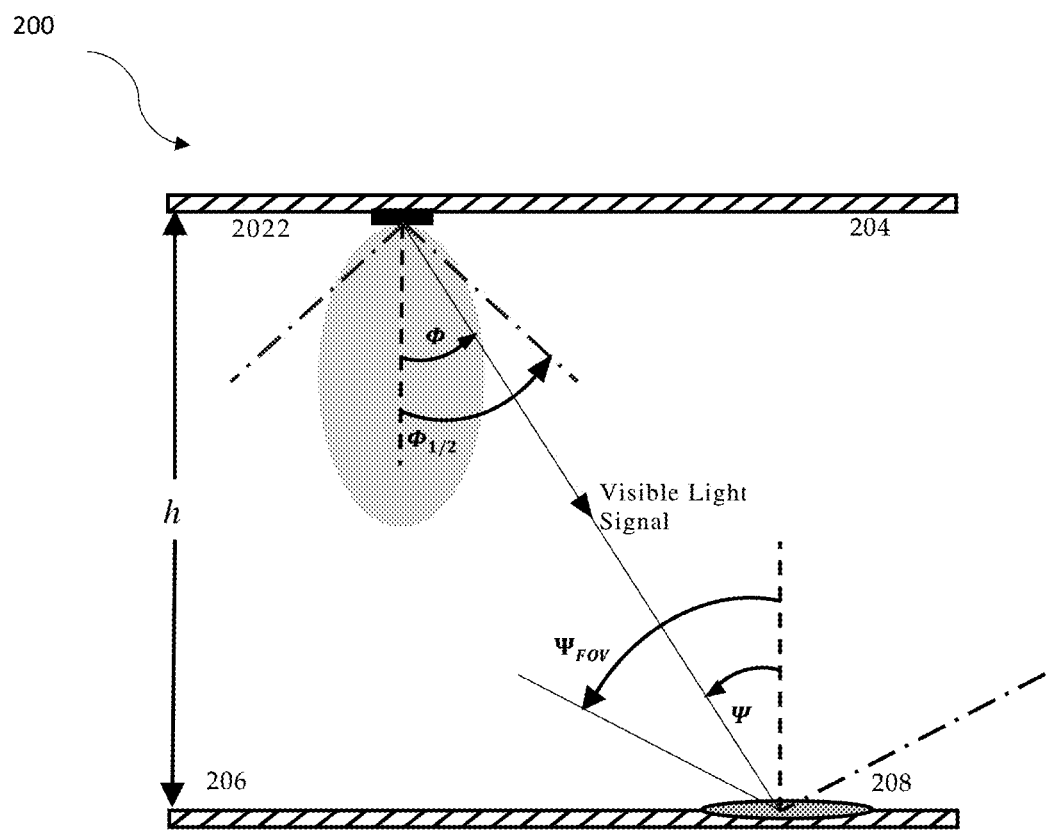
FIG. 2 illustrates the LOS path of an indoor non-directed VLC link, according to an exemplary implementation of the present invention.

FIG. 2 illustrates a diagram (200) depicting the LOS path of an indoor non-directed VLC link, according to an exemplary implementation of the present invention. The figure includes a LED transmitter (202), configured to transmit visible light signals towards a detector (208), said detector is placed on a detector plane (206). The detector (208) is configured to receive the visible light transmitted by the LED transmitter (202). The estimated position of the LED transmitter (202) can be obtained by a peak detection method. The LED transmitter is installed on the transmitter plane (204). The peak in a power profile to identify the position of the LED transmitter (202) can be obtained as demonstrated below.

The intensity of transmitted radiation (in W/sr) from LEDs is given as, $$I = \frac{(m+1)}{2\pi} P_t \cos^m \phi \tag{1}$$

where $\phi$ is the irradiance angle with respect to the axis normal to the LED surface, m is the Lambertian order of emission and $P_t$ is the total power transmitted by the LEDs given as, $P_t = N_{LED} \times P_{LED}$, where $N_{LED}$ is the total number of LEDs and $P_{LED}$ is the power transmitted by each LED. Now, consider that the transmitter and detector are located at points $(x_1, y_1, h)$ and $(x, y, 0)$, respectively, such that the vertical separation between the planes, then the angle of incidence ($\psi$) with respect to the receiver axis is, $$\psi = \cos^{-1}\left[\frac{h}{\sqrt{(x-x_1)^2 + (y-y_1)^2 + h^2}}\right] \tag{2}$$

In an indoor environment, like an office space or warehouse, the transmitter and receiver planes are perfectly parallel to each other. Hence, $\phi = \psi$. The effective area of the detector ($A_{eff}$) is the actual area available for photo-detection and is given as, $$A_{eff}(\psi) = A T_f(\psi) g(\psi) \cos \psi \tag{3}$$

where A is the physical area of the detector, $T_f(\psi)$ is the optical filter transmission coefficient, $\psi_{FOV}$ is the field of view (FOV) of the detector and $g(\psi)$ is the concentrator gain given as, $$g(\psi) = \frac{n^2}{\sin^2 \psi_{FOV}} \tag{4}$$

where n is the refractive index of the concentrator. Note that, for $\psi \geq \psi_{FOV}$, $A_{eff}=0$ and hence, $g(\psi)=0$. Moreover, since we do not use any optical filter so $T_s(\psi)=1$. The power received by the detector is, $$P_R = \frac{IA_{eff}}{(x-x_1)^2 + (y-y_1)^2 + h^2} \quad (5)$$

Using (1)-(5), we derive the expression for power received at an angle $\psi \geq \psi_{FOV}$ by the detector. This can be expressed as, $$P_R(x, y) = \frac{n^2(m+1)AP_t}{2\pi h^2 \sin^2 \psi_{FOV}} \left[ \frac{h}{\sqrt{(x-x_1)^2 + (y-y_1)^2 + h^2}} \right]^{m+3} \quad (6)$$

The optical power distribution on the receiver plane is obtained using equation (6). The distance of the transmitter from the floor is least at the point just below the transmitter and hence the peak power from a transmitter is detected exactly at that point. Thus, the coordinates at which peak power is observed can be considered as an estimate of the actual position (x, y) of the transmitter on the ceiling. The estimated position $(x_t, y_t)$ of the $t^{th}$ transmitter is obtained using the peak of the power profile as, $$(x_t, y_t) = \underset{(x,y)}{\arg\max} P_R(x, y) \quad (7)$$

The conventional positioning principle is used for the positioning of the LED transmitter (202) by identifying power peak in its associated power profile. The said positioning principle could be used for localization of targets for the present invention, but due to practical limitations, the LED transmitter (202) could not be installed on mobile targets for identification of the mobile targets in an indoor environment.

Instead of using the LED transmitter on the mobile targets, plurality of passive reflectors (not shown here) are installed on one or more targets in the present invention.

Figure 3:
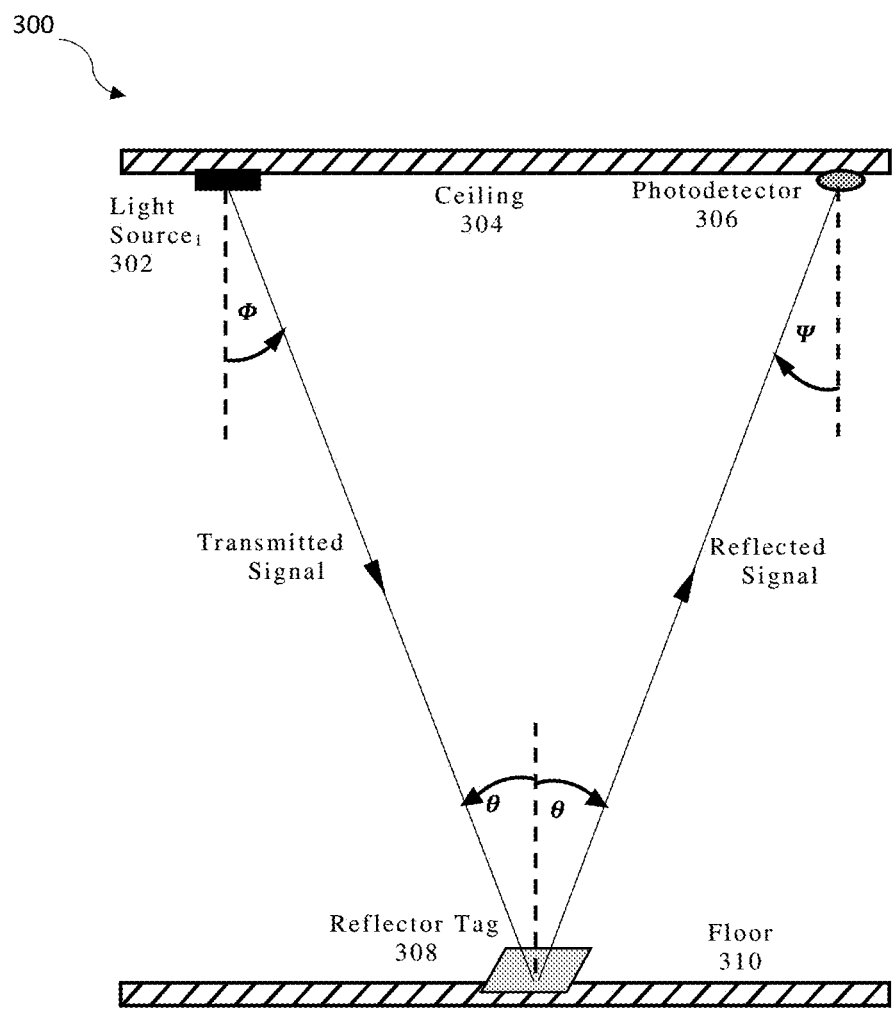
FIG. 3 illustrates a propagation model of indoor positioning technique, according to an exemplary implementation of the present invention.

FIG. 3 illustrates a diagram 300 depicting the propagation model for identification of the one or more passive optical identifier tag (102) from the plurality of passive optical identifier tags in the associated environment, according to an exemplary implementation of the present invention. The FIG. 300) illustrates a propagation model to identify a reflector tag (308) in VLC based indoor positioning technologies. The FIG. 300) includes the light source (302) installed on the ceiling (304). The figure also includes the reflector tag (308) placed on a floor (310). Further, the figure includes a photodetector (306) installed on the ceiling (304) to receive the reflected signal.

In the present exemplary implementation, the system uses the photodetector (306) to detect the position of the reflector tag (308) placed on floor (310) using the positioning technique. The light source (302) is configured to transmit the visible light towards the reflector tag (308). The reflector tag (308) is configured to receive the transmitted light from the light source (302) and to further transmit the reflected light towards the photodetector (306). The profile of the reflected power from each of the reflector tag (308) is received by the photodetector (306). The power peak in associated power profile received at the photodetector (306) will be used to estimate the position of the reflector tag (308), and hence the reflector tag (308) can be localized by using said positioning technique. The only difference is that the reflected power from the reflector tag (308) is less than the power initially transmitted by the light source (302), because the transmitted light has to pass through the indoor channel twice as shown in FIG. 3. Hence, positioning of the single reflector tag (308) can be achieved by simple peak detection. However, the positioning of a plurality of reflector tags (not shown here) would involve localization as well as identification to clearly distinguish the reflector tag (308) from the plurality of reflector tags.

When the basic peak detection technique is applied for positioning of the plurality of reflector tags, the resulting power profile observed on the ceiling (304) includes reflections from plurality of the reflector tags. Some of these peaks might superimpose and form a higher and broader peak, resulting in poor location estimation. Moreover, the peaks corresponding to the plurality of the reflector tags would appear same to the photodetector (306). The system fails to identify which peaks correspond to which of the reflector tags and hence it is difficult to distinguish the position of one reflector tag (308) from that of another. Therefore, identification of multiple reflector tags is not possible using the simple positioning technique. Hence, the peak detection technique gives poor localization and fails to identify or distinguish the reflector tags from one another. To achieve the positioning of the multiple reflector tags, it is essential that the receiver must be able to distinguish between the signal reflected from different reflector tags to locate and identify the reflector tags properly. So, a wavelength-sensitive receiver (104) is implemented in the present invention that can distinguish the signals reflected from plurality of reflector tags, and to locate and identify the reflector tag (308) in an indoor environment.

Figures 4, 5:
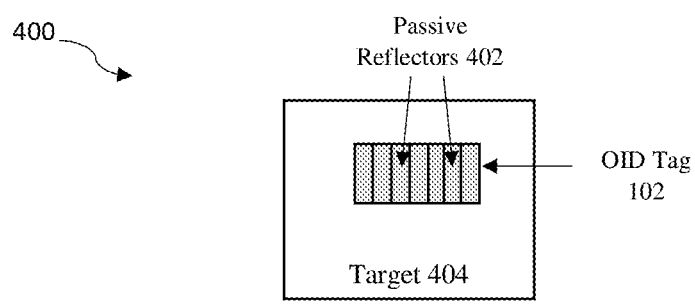
FIG. 4 illustrates a diagram depicting the structure of a passive optical identifier tag installed on the target, according to an exemplary implementation of present invention.
FIG. 5 illustrates a reflection sequence of an OID, according to an exemplary implementation of the present invention.

FIG. 4 illustrates a diagram (400) depicting the structure of the one or more passive optical identifier (OID) tag where the one or more passive optical identifier tag (102) is installed on a target (404) to reflect the unique set of wavelengths from the visible light spectrum, according to an exemplary implementation of present invention. The diagram (400) also includes a unique set of passive reflectors (402), each reflecting a particular wavelength, installed inside or outside the passive optical identifier tag. Depending upon the characteristics of these reflectors, the one or more OID tag (102) transmits the reflected light towards the receiver (104).

In the present exemplary implementation, the one or more OID tag (102) is used to transmit the reflected light with a unique set of wavelengths towards the receiver (104). The passive reflectors (402) are installed inside or outside each of the OID tags. So, the one or more OID tag (102) is a combination of single wavelength passive reflectors (402), each reflecting a unique wavelength $\lambda_i$ out of a set of w distinct wavelengths, defined as $W=\{\lambda_1, \lambda_2, \lambda_3, \ldots, \lambda_w\}$. Hence, i is an integer in the range [1, w]. The choice of reflectors (402) depends on the number of targets (N) to be positioned. If N is large, then the reflectors are dielectric mirrors that have very sharp reflectance characteristics, and reflect a very narrow range of wavelengths, thereby enabling precise identification of a plurality of targets. However, if N is small then the reflectors are colored glass reflectors that are cheaper, but such reflectors respond to a broader range of wavelengths, making it impossible to distinguish between closely spaced adjacent wavelengths. The said OID has multiple sections of different dielectric mirrors or colored glass enabling it to reflect a unique set of wavelengths.

The set of wavelengths to which the one or more OID tag responds depends on the combinational arrangement of gratings being used. This combination is unique and hence each one or more OID tag has its own unique set of wavelengths which it reflects. The characteristic wavelengths to which the one or more OID tag (102) responds can be inferred from corresponding reflection sequence. Reflection sequence of the one or more OID tag (102) is shown in FIG. 5. The reflection sequence of the one or more OID tag (102) is a w-bit binary word, where w is the number of wavelengths being used for positioning. Here, the $i^{th}$ bit ($b_i$) denotes whether the OID tag reflects the $i^{th}$ wavelength ($\lambda_i$) or not. If the $i^{th}$ bit is set, i.e., $b_i=1$, then this signifies that the particular OID tag reflects $\lambda_i$ else it does not. Thus, each of the OID tags has a unique reflection sequence (or binary word) and hence a unique decimal number associated with it which can be used for identification of the target (404) on which that OID tag (102) is installed. Depending upon which bits of its reflection sequence is set, each OID tag reflects m out of the w wavelengths being used, where m is an integer in the range [1, w].

The decimal number $D_n$ associated with the $n^{th}$ target $T_n$ can be obtained from its reflection sequence as, $$D_n = \sum_{i=1}^{w} b_i 2^{i-1} \quad (8)$$

In an exemplary embodiment of the present invention, reflection sequence of a plurality of targets can be achieved by above-given formula. Consider a system designed for ten wavelengths, i.e., w=10, consider a target with an OID whose reflection sequence is 0110101001. Here, the bits $b_1$, $b_4$, $b_6$, $b_8$, and $b_9$ are set, i.e., the OID reflects the wavelengths $\lambda_1$, $\lambda_4$, $\lambda_6$, $\lambda_8$, and $\lambda_9$. Using equation 8, the decimal number associated with this target is 425. Therefore, the decimal number $D_n$ associated with the $n^{th}$ target $T_n$ can be obtained from its reflection sequence as explained above. The reflection sequence for $n^{th}$ target is shown in FIG. 5. For this OID, m=5, i.e., it responds to (or reflects) five out of the ten wavelengths being used for positioning.

Although each OID reflects a unique set of wavelengths, but any two OIDs may have one or more common wavelengths in their reflection sequences. It is this sharing of wavelengths that imparts very high scalability to the optical identification algorithm. Since the OID can be sensitive to m number of wavelengths, so for each value of m, there are $\binom{w}{m}$ unique ways of choosing these m wavelengths out of the w available wavelengths, where $\binom{a}{b}$ denotes the binomial coefficient. Hence, the maximum number of OIDs which can be created with w wavelengths is the sum of all these possibilities and can be expressed as, $$N_{max} = \binom{w}{1} + \binom{w}{2} + \binom{w}{3} + \ldots + \binom{w}{w} = \sum_{n=1}^{w} \binom{w}{n} \quad (9)$$

The sum of binomial coefficients is expressed as, $$\sum_{n=0}^{w} \binom{w}{n} = 2^w \Rightarrow \sum_{n=1}^{w} \binom{w}{n} = 2^w - 1 \quad (10)$$

Hence, from (9) and (10), $$N_{max} = 2^w - 1 \quad (11)$$

Therefore, by using w wavelengths, the positioning of a maximum of $2^w-1$ targets can be achieved. This suggests that the number of targets that can be positioned scales exponentially with the number of wavelengths being used.

Figure 6:
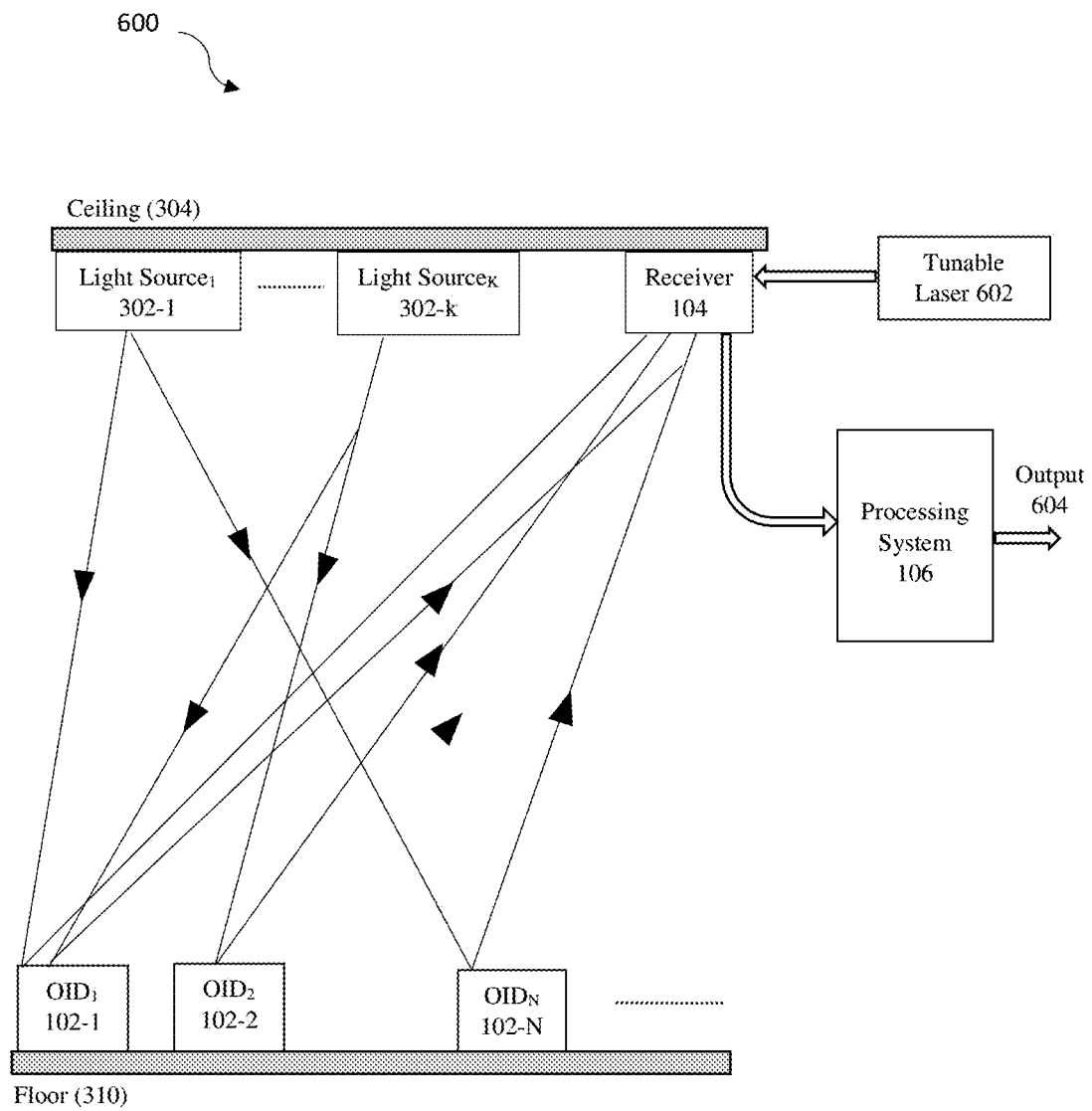
FIG. 6 illustrates a block diagram depicting identification of one or more passive optical identifier tag from plurality of optical identifier tags in an indoor environment, according to an exemplary implementation of the present invention.

FIG. 6 illustrates a block diagram (600) depicting an identification of the one or more passive optical identifier tag (101) from the plurality of optical identifier tags (102-1-102-N) in an indoor environment, where the receiver (104) configured to receive the reflected light at pre-configured one or more wavelengths along with their respective power profiles, according to an exemplary implementation of the present invention. The block diagram (600) includes the ceiling (304). A plurality of light sources (302-1-302-k) is installed on the ceiling (304). The block diagram (600) also includes the receiver (104) installed on the ceiling (304). The block diagram (600) also includes plurality of optical identifier tags (102-1-102-N) placed on the floor (310). The said OID tags (102-1-102-N) could be stationary or mobile. The block diagram (600) also includes a tunable laser device (602) connected wirelessly or wired with said receiver (104). The receiver (104) is also connected wired or wirelessly with a processing system (106). The block diagram (600) also includes an output (604) to be displayed on the computing devices (134).

In the present exemplary implementation, the receiver (104) receives transmitted light from the optical identifier tags (102). The light source (302-1-302-k) is configured to emit light towards the optical identifier tags (102-1-102-N) placed on the floor (310). The OID tags (102-1-102-N) transmit the reflected light with a unique set of wavelengths towards the receiver (104). The receiver (104) is configured to receive the reflected light at pre-configured one or more wavelengths along with their respective power profiles. The tunable laser device (602) configured to transmit laser power at pre-configured one or more wavelengths towards the receiver (104).

In the present exemplary implementation, the receiver (104) employs a single array of photodiodes (706) to detect and distinguish one or more wavelengths. The photodiodes (706) receive the reflected light transmitted by the OID tags (102-1-102-N) at one or more wavelengths. At each reflected wavelength, the photodiodes (706) receives a power profile termed herein as color snap at that particular wavelengths. The peak determines the location of the one or more OID tag (102), while the wavelength (at which the said color snap is obtained) is used to distinguish one OID tag (102) from a plurality of the OID tags (102-1-102-N) When visible light from the light source (302) falls on the OID tags (102-1-102-N)), each of the one or more OID tag (102) reflects back its respective set of wavelengths which is inferred by corresponding reflection sequence. The receiver should function in such a way that the array of photodiodes (706) in the receiver (104) effectively senses only one wavelength at a particular time instant.

Figure 7:
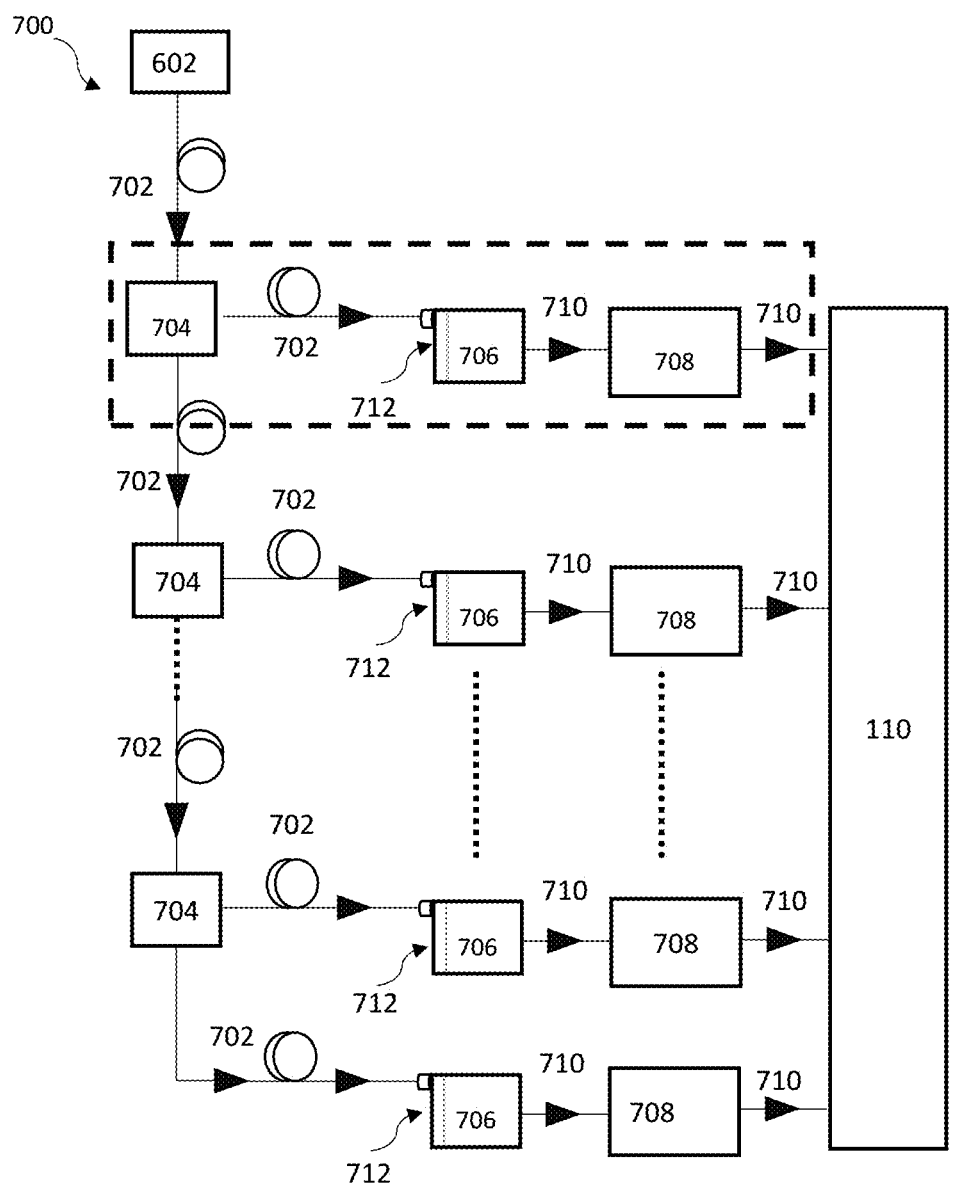
FIG. 7 illustrates the design of a tunable receiver, according to an exemplary implementation of the present invention.

FIG. 7 illustrates a block diagram (700) depicting the wavelength-sensitive tunable receiver (104) that receives reflected light from the plurality of passive optical identifier tags and laser power from the tunable laser (602) at the same time, according to an exemplary implementation of the present invention. The block diagram (700) includes the tunable laser device (602) configured to transmit laser power at pre-configured one or more wavelengths towards the photodiodes (706). The block diagram (700) also includes an optical fiber (702) connected to the tunable laser (602). The optical fiber (702) is responsible to pass the laser power towards the photodiodes (706). The block diagram (700) also includes power splitters (704), where the power splitters (704) are responsible to divide and distribute the laser power towards the photodiodes (706). The power splitters (704) and the photodiodes (706) of the present invention are connected with each other by said optical fibers (702). Further, the block diagram (700) includes the photodiodes (706) to receive the laser power and the reflected light (712). The block diagram (700) further includes an array of low pass filters (708) which receive electrical power from the photodiodes (706) through electrical connections (710). The low pass filters (708) remove high frequency components and pass only the low frequency and DC components. The low pass filters (708) are further connected to the processor (110) of the processing system (106) through electrical connections (710).

Figure 8:
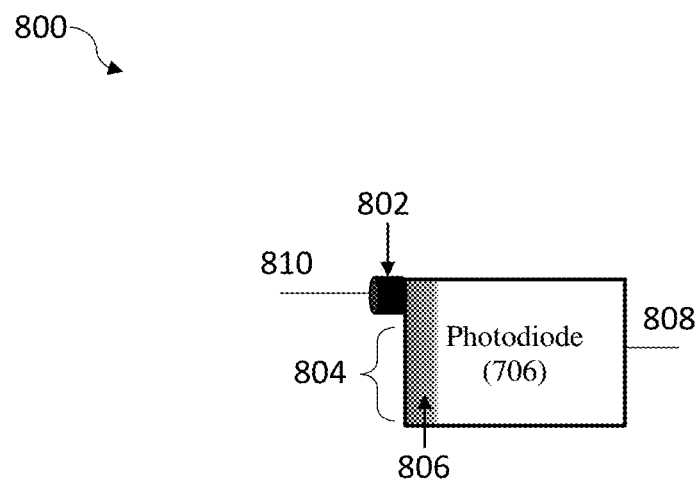
FIG. 8 shows a structure of photodiodes, according to an exemplary implementation of the present invention.

In the present exemplary implementation, the receiver (104) employing the single array of photodiodes (706), to detect and distinguish all the received wavelengths. The tunable laser (602) is configured to transmit power at pre-configured one or more wavelengths to each of the photodiodes in the array through the optical fibers (702) via said power splitters (704). The photodiodes (706) also receive visible light signals (712) reflected by the OID tags (102) placed on the floor (310). In order to enable the photodiodes (706) to receive the laser power and the reflected light at the same time, the active region of the photodiode is divided into two parts. The smaller part has a pig-tail connection (802) for optical fiber input (810) whereas the larger part is kept bare (804) to receive the wireless visible light signal (712), as shown in FIG. 8. This type of dual connection can be easily achieved by increasing the active region area of the photodiode. The photodiode used in the positioning system is designed with a large active area to implement the dual input provision. The electrical output (808) from the photodiodes (706) is given to the array of low pass filters (708) which is used in case the number of targets is large. The output from each of a LPF or a photodiode is fed to the processor (110) of the processing system (106) which interprets the data to localize and identify all the targets as per the processing algorithm.

When the light source emits light towards the plurality of OID tags then each of the one or more OID tag (102) from the plurality of OID tags reflects back its respective set of wavelengths inferred by corresponding reflection sequence (500). Each of the photodiodes receives the reflected light comprising a number of wavelengths. The receiver (104) should function such that the array of photodiodes (706) effectively senses only one wavelength at a particular time instant.

So, the laser (602) is tuned in a cyclic and periodic manner to emit light at one of the w wavelengths of the set W, which is the same wavelength set for which plurality of OID tags have been designed. At a particular time instant $t_i$, consider that the laser (602) is tuned to emit power at wavelength $\lambda_i$ belonging to the set W. The power splitters (704) divide and distribute this power to reach every photodiode through the pig-tail connection (802) as shown in FIG. 8. At the same time, each photodiode also receives, on the bare active region (804), reflected light (712) comprising of all wavelengths $\lambda_1$ to $\lambda_w$ reflected by the OID tags, i.e., all wavelengths of the same set W.

Since a photodiode is inherently a square-law device, so optical frequency beating occurs among the frequencies present in the input signals which produces the frequency components: $f_1 \pm f_i$, $f_2 \pm f_i$, ..., $f_i \pm f_i$, ..., $f_w \pm f_i$, $2f_1$, $2f_2$, ..., $2f_i$, ..., $2f_w$ and some DC components whose magnitudes are constant irrespective of the wavelength $\lambda_i$ to which the laser is presently tuned. Here the frequencies $\{f_1, f_2, f_3, ..., f_w\}$ correspond to the wavelengths in the set W. It is interesting to note that the components $f_i \pm f_i$ are basically $2f_i$ and a zero frequency (DC) component. However, unlike the other DC components mentioned earlier, this DC component has a magnitude which depends on the power received at wavelength $\lambda_i$ which is the same wavelength to which the laser is presently tuned. All the non-DC components are very high frequencies and are blocked by the photodiode (706) which is inherently a low pass filter in nature. However, if the number of wavelengths in the set W is large, then wavelengths would be very closely spaced and hence the difference frequency components may not get filtered out by the photodiode. In this case, it may be required to use an additional LPF (708) after the photodiode to filter out these frequency components. Consequently, only the DC components are fed as input to the processor (110). The DC components which are independent of $\lambda_i$ remain constant regardless of the wavelength to which the laser (602) is tuned. Hence they do not carry any information related to positioning and can be eliminated by the processor (110) itself. Finally, the DC component that depends on $\lambda_i$ is treated as useful data by the processor (110). So, effectively, each time the laser (602) is tuned to a wavelength $\lambda_i$, the receiver picks up only that component of the received visible light signal which corresponds to $\lambda_i$. Hence, although all the reflected wavelengths are received by the array of photodiodes (706) in the receiver (104), but when the laser (602) is tuned to wavelength $\lambda_i$, then the processor (110) gathers only that information from the photodiodes (706) which is related to wavelength $\lambda_i$. In this manner, as the laser (602) is tuned to all the wavelengths one by one in a cyclic manner (900), the processor (110) determines the position of all the targets using the positioning methodology.

Figure 9:
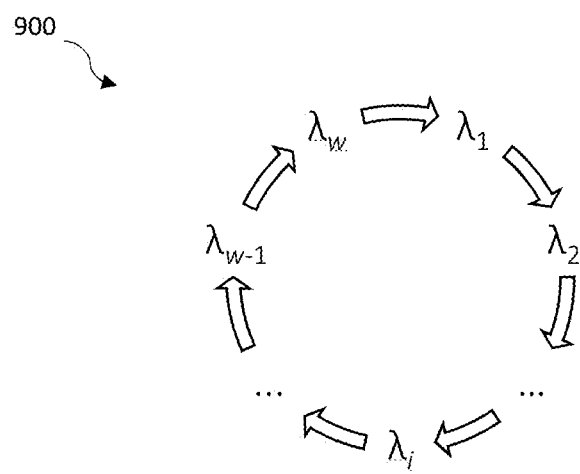
FIG. 9 illustrates a tuning cycle of the laser, according to an exemplary implementation of the present invention.

FIG. 9 illustrates a diagram (900) depicting the tuning of the laser (602) to one or more wavelengths to determine the positions of the corresponding OID tags, according to an exemplary implementation of the present invention. Since the OID tags can be mobile, so even after the laser (602) has been tuned to one or more wavelengths and the positions of the corresponding OID tags have been determined, the position of the mobile one or more OID tag may change. Hence the positioning process must be continued by tuning the laser (602) to each wavelength in a cyclic manner (as shown in FIG. 9) so that the determined position of each target (404) is refreshed after a particular time. The time interval between tuning the laser (602) to two successive wavelengths is called the laser tuning period ($t_L$) and the time after which the position of each target is refreshed is called the refresh time ($t_R$). These are related as, $t_R = w \times t_L$.

The value of $t_L$ depends on the physical design of the tunable laser (602) whereas $t_R$ is determined by the mobility of the OID tags. For a given number of the OID tags if the OID tags are highly mobile (i.e. a low value of $t_R$ is required), then the laser (602) should be designed such that it can be tuned to different wavelengths very quickly so that $t_L$ remains low. Such lasers are costly and difficult to manufacture. Moreover, there are physical constraints to the speed at which the output wavelength of a laser can be changed and this imposes a limit on the mobility of the targets. Furthermore, even if costly lasers are used with low values of $t_L$ but a large number of targets would increase the value of $t_R$, thereby limiting the mobility of OID tags. Hence, the allowable mobility for OID tags depends on the number of OID tags as well as the type of tunable laser being used in the receiver. Since the major focus of the proposed system is on inventory management, so a reasonable choice would be that every OID tag gets its position refreshed in about 5 seconds, i.e., $t_R \approx 5$ s.

Figure 10:
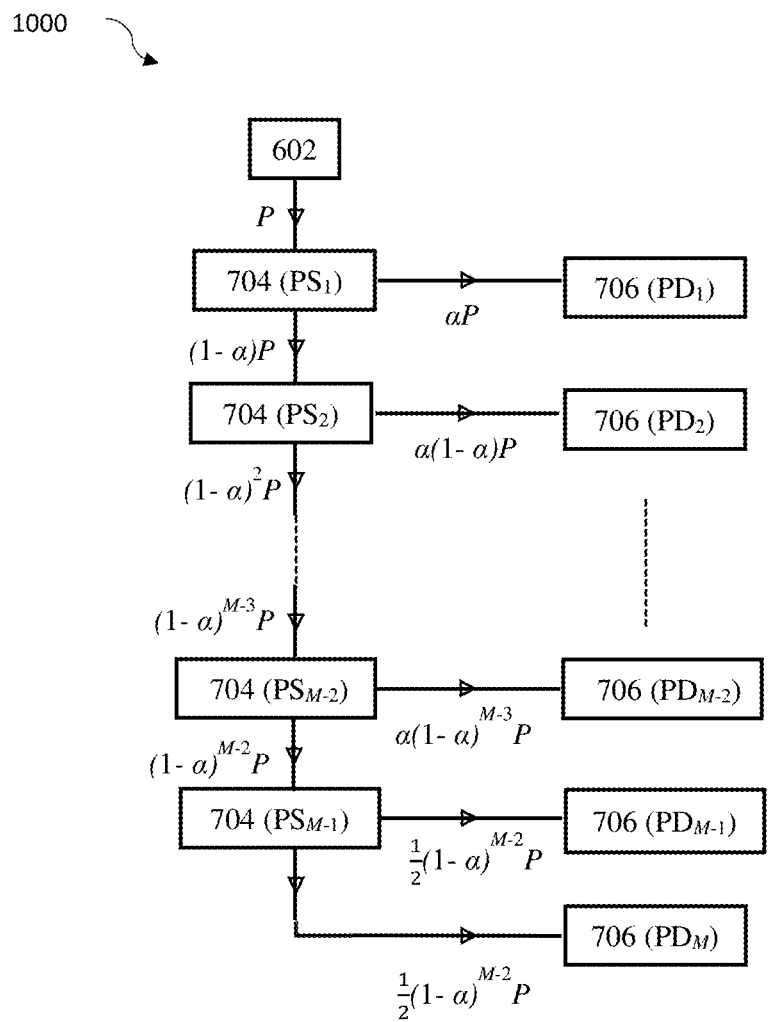
FIG. 10 illustrates a power flow diagram for the tunable receiver, according to an exemplary implementation of the present invention.

FIG. 10 illustrates a block diagram (1000) depicting the distribution of laser power through optical fibers (702) in a receiver (104), according to an exemplary implementation of the present invention. The block diagram (1000) includes a tunable laser (602) configured to be tuned in a cyclic and periodic manner (900) to transmit power through the optical fibers (702) towards the array of photodiodes (706) at pre-configured one or more wavelengths. Power splitters (704) are configured to divide and distribute the laser power to the photodiodes (706).

In the present exemplary implementation, the power flow block diagram depicting the distribution of power through the optical fibers in the receiver is shown, where it is evident that to feed power to M number of photodiodes (706), M−1 number of (1×2) power splitters (704) are required. Optical power P from the tunable laser (602) flows through a series of successive power splitters such that one port of the $k^{th}$ power splitter ($PS_k$) feeds power to the corresponding $k^{th}$ photodiode ($PD_k$) while the other port sends power to the next $(k+1)^{th}$ power splitter, $PS_{k+1}$, where k is an integer in the range [1, M]. The first M−2 power splitters have an asymmetrical splitting ratio of $\alpha:(1-\alpha)$, where $0<\alpha<1$. Since power splitters are nothing but directional couplers, so it is possible to obtain an arbitrary splitting ratio by appropriately choosing the value of coupling coefficient ($\kappa$) and interacting length (L) of the coupler. Due to the successive splitting of power, we have, $P_k = \alpha P'_{k-1}$ and $P'_k = (1-\alpha)P'_{k-1}$ where, $P_k$ and $P'_k$ are the powers being fed from $PS_k$ to $PD_k$ and $PS_k$ to $PS_{k+1}$, respectively. Hence, $P_k : P'_k = \alpha:(1-\alpha)$ and $P_k = P'_{k-1} - P'_k$. In general, $$P_k = \alpha(1-\alpha)^{k-1}P \quad (12)$$

$$P'_k = (1-\alpha)^k P \quad (13)$$

However, both the output ports of the last $(M-1)^{th}$ power splitter are connected to photodiodes and hence the $(M-1)^{th}$ power splitter should have a symmetrical splitting ratio of 1:1 to feed equal power to the last two photodiodes. Moreover, the value of $\alpha$ should be chosen such that the power inputs to the first and last PD, i.e., $PD_1$ and $PD_M$ are equal. This would ensure that all PDs receive almost the same input optical power and thereby work satisfactorily. Hence, required $P_1 = P_M$, which gives, $$\alpha P = \frac{P}{2}(1-\alpha)^{M-2} \quad (14)$$

This can be simplified to, $$M = \frac{\log 2\alpha}{\log(1-\alpha)} + 2 \quad (15)$$

The value of M, i.e., the number of PDs to be installed, depends on the spatial resolution required in the positioning system to be designed. Once M is chosen, the value of $\alpha$ can be obtained using (15).

Figure 11:
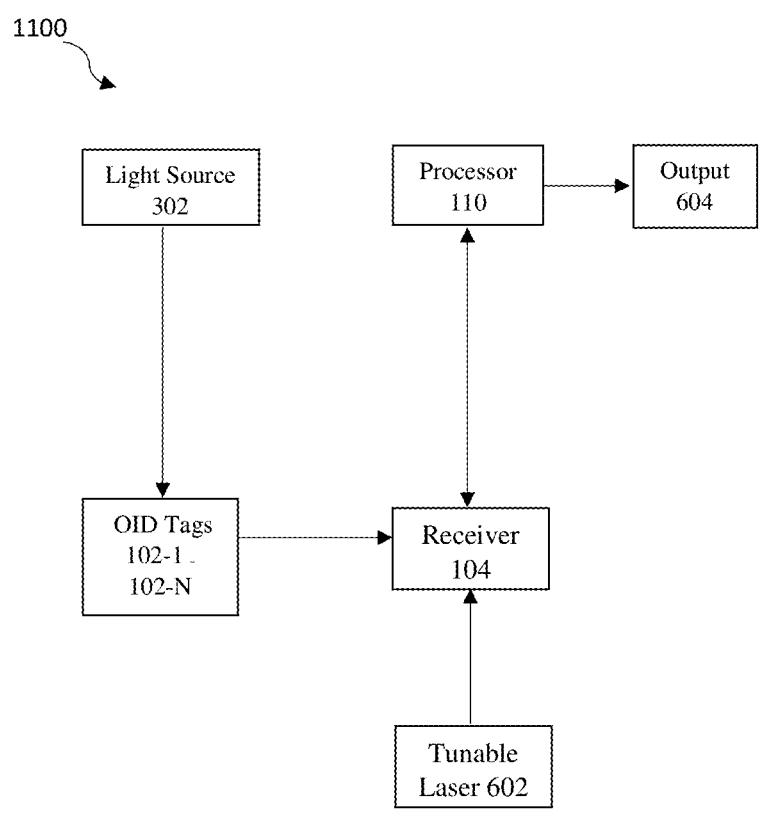
FIG. 11 illustrates a block diagram depicting the main components of the proposed positioning system, according to an exemplary implementation of the present invention.

FIG. 11 illustrates a block diagram (1100) depicting an identification of the one or more passive optical identifier tag (102) from the plurality of passive optical identifier tags in the associated environment, according to an exemplary implementation of the present invention. The block diagram (1100) includes the light source (302) configured to emit light towards the optical identifier tags placed on the floor (310). The OID tags are configured to transmit reflected light towards the receiver (104). The block diagram (1100) also includes the tunable laser device (602) configured to transmit laser power at pre-configured one or more wavelengths towards the receiver. The block diagram (1100) also includes the processor (110) using the optical identification algorithm. The block diagram (1100) also includes an output (604) to be displayed on the computing devices (134).

In the present exemplary implementation, the block diagram (1100) includes the light source (302) configured to emit light towards the optical identifier tags placed on the floor (310). The OID tags are configured to transmit reflected light towards the receiver (104), whereas each of the OID tags reflects a unique set of wavelengths. The receiver includes the array of photodiodes (706) that captures the reflected light at pre-configured one or more wavelengths along with their respective power profiles. At the same time the photodiodes (706) also receive the laser power at pre-configured one or more wavelengths transmitted by the tunable laser device (602). Since photodiode is inherently a square-law device, so optical frequency beating starts among the frequencies present in input signals (reflected light wavelengths along with power profiles and the wavelength at which the laser power is emitted towards the photodiodes). Further, the photodiodes (706) transmits DC components data as a result of optical frequency beating, towards the processor (110). This DC component has a magnitude which depends on the power received at pre-configured one or more wavelengths which is the same wavelengths to which the laser is tuned. Hence, the processor (110) based on the DC components data can determine the position and identification of all OID tags. The said data can be sent to the analyzer module and identification module to identify the identification of one or more OID tag from plurality of OID tags.

The analyzer module (116) is configured to analyze the wavelengths and the respective power profiles of the light source (302), whereas the identification module (118) is configured to identify the position and identification of the one or more OID tag (102) from the plurality of the OID tags. The positioning of the OID tags is obtained by identification of the power peaks in each of the color snaps using the positioning principle. Identification of the target is obtained by generating the reflection sequence (500). The reflection sequence can be obtained by analyzing the positions of the OID tags in different color snaps. If the one or more OID tag location shows up in the color snap of $\lambda_i$, then set $b_i=1$ in the reflection sequence else $b_i=0$. In this way, the complete w-bit reflection sequence can be determined by looking at the color snaps of all w wavelengths. The decimal equivalent $D_n$ of the reflection sequence is obtained using equation (8) and hence the target as $T_n$ can be identified. Targets are distinguishable because two different targets have different OIDs and hence they can never have the same reflection sequence. This can be easily understood from next exemplary embodiment given below.

In an exemplary embodiment of the present invention, an example of a positioning system using OID tags is provided. Consider a system designed for three wavelengths based on the proposed algorithm. Using equation (11), it can be calculated that for w=3, $N_{max}$=7. It can be seen that location and identification of a maximum seven targets can be achieved by using this system. Let these targets be denoted by $T_n$, where n=1, 2, . . . , 7. The reflection sequences of OIDs can be generated using the procedure explained above and are listed in Table I.

TABLE I

Reflection sequences for OIDs when w = 3

| Target | Wavelengths reflected by OID | Reflection sequence |
|---|---|---|
| $T_1$ | $\lambda_1$ | 001 |
| $T_2$ | $\lambda_2$ | 010 |
| $T_3$ | $\lambda_1, \lambda_2$ | 011 |
| $T_4$ | $\lambda_3$ | 100 |
| $T_5$ | $\lambda_1, \lambda_3$ | 101 |
| $T_6$ | $\lambda_2, \lambda_3$ | 110 |
| $T_7$ | $\lambda_1, \lambda_2, \lambda_3$ | 111 |

TABLE II

Look-up Table for possible targets in a color snap when w = 3

| Color snapping wavelength | Possible targets present |
|---|---|
| $\lambda_1$ | $T_1, T_3, T_5, T_7$ |
| $\lambda_2$ | $T_2, T_3, T_6, T_7$ |
| $\lambda_3$ | $T_4, T_5, T_6, T_7$ |

OIDs installed on the targets reflect a unique set of wavelengths from the visible light emitted from the light source. The laser present in the receiver architecture is tuned to the three wavelengths one by one. At a particular time, due to the optical frequency beating phenomenon at the photodiodes, their outputs depend on the same wavelength component to which the laser is presently tuned so that the corresponding color snap is captured by the processor. The positions, as well as identities of the targets, are unknown, but using Table I, the wavelengths reflected by each targets can be inferred. With this information, the targets whose reflected power profiles may be present in the color snap of a particular wavelength can be determined. This can be summarized as a look-up table, shown in Table II.

The following conclusions can be drawn from the look-up table (Table II):

(1). The power profiles reflected from $T_1$, $T_2$ and $T_4$ will be present only in the color snaps obtained by $\lambda_1$, $\lambda_2$, and $\lambda_3$, respectively. Hence their positions can be directly determined from the corresponding color snaps.

(2). The power profiles reflected from $T_3$, $T_5$ and $T_6$ will be present only in two of the three color snaps and their positions can be determined by looking at the color snaps obtained by those wavelengths. For example, the power profile of $T_3$ would be present only in the color snaps obtained by $\lambda_1$ and $\lambda_2$. Hence the position of $T_3$ can be determined by identifying that power profile which occurs at the same location in the color snaps obtained by $\lambda_1$ and $\lambda_2$. Similarly, the positions of $T_5$ can be obtained by looking at the color snaps of $\lambda_1$ and $\lambda_3$ while that of $T_6$ can be determined by looking at the color snaps of $\lambda_2$ and $\lambda_3$.

(3). The power profile reflected from $T_7$ will be present in all the three-color snaps. Hence its position can be determined by looking at all the color snaps together and identifying that particular power profile which occurs at the same location in all three-color snaps.

Figure 12A:
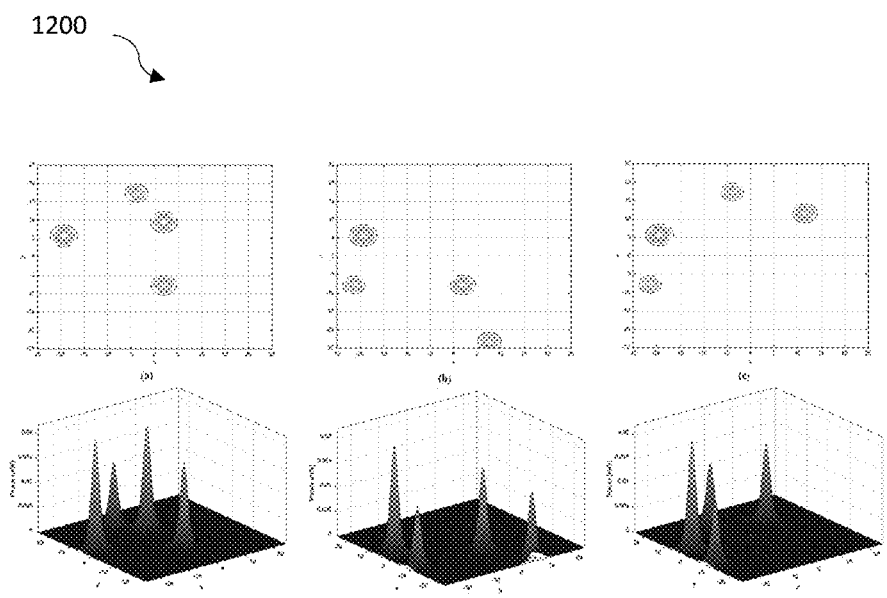
FIG. 12a shows contour plots and color snaps for seven randomly placed objects with $\lambda_1$, $\lambda_2$, and $\lambda_3$, according to an exemplary implementation of the present invention.

As more and more targets keep getting identified, the process keeps becoming progressively simpler. Now consider a situation when these seven randomly placed targets are present in an indoor environment where this system is employed for positioning. This environment is stimulated in MATLAB software. The laser was tuned first to $\lambda_1$, then to $\lambda_2$ and finally to $\lambda_3$ and the power profile in the color snaps, obtained at the photodiodes for each of the three wavelengths was observed. The power contours and color snaps are shown in FIG. 12a.

Figure 12B:
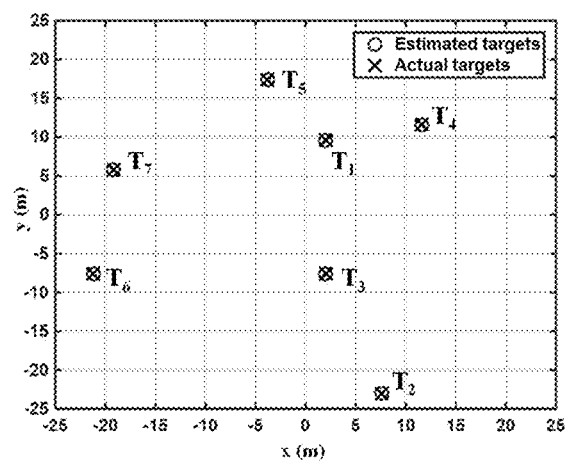
FIG. 12b shows actual and estimated positions of seven randomly placed objects, according to an exemplary implementation of the present invention.

Based on the conclusions drawn from the look-up table (Table II), the targets and their positions can be identified as depicted in FIG. 12b. It can be observed that the actual and estimated positions of the target coincide which indicates that this system works with negligible positioning error.

In one of the exemplary embodiments of the present invention, positioning system performance evaluation based on its error performance is provided. In ideal conditions, the location obtained from the peaks in the color snaps should correspond to exact positions of targets. However, OIDs have one or more common wavelengths in their reflection sequences and so the same common wavelength may get reflected from multiple targets. Since these reflections belong to the same wavelength so they create power profiles in the same color snap (obtained at the common wavelength) and hence influence the power profiles of one another in the color snap. This causes the peaks to shift away from their actual positions in the power profiles and sometimes they may even overlap or coincide with each other. Consequently, the position of the same target obtained from different color snaps would be slightly different leading to inaccuracies in positioning. To mitigate this inconsistency, the final position of the target is obtained by taking the average of its positions obtained from different color snaps. Therefore, the target localization phase of the algorithm, particularly the peak identification process, introduces error and limits the maximum number of targets that can be accurately localized. It should be noted that besides the algorithmic error due to improper peak detection, the positioning error also comprises the architectural error due to finite size of the photodiodes and the targets.

In practice, the targets to be positioned would be randomly located in the room without following any set pattern. The error in positioning of each target is different and independent of that of the other. The positioning error of the $i^{th}$ target ($T_i$) is defined as, $$e_i = \sqrt{(x_i - \hat{x}_i)^2 + (y_i - \hat{y}_i)^2} \quad (16)$$

where, ($x_i$, $y_i$) and ($\hat{x}_i$, $\hat{y}_i$) are the actual and estimated coordinates of $T_i$, respectively. For the analysis of error performance, the worst-case positioning error can be considered as the maximum positioning error that may occur in a particular configuration of targets. It is expressed as, $$e \triangleq \max(e_i) \quad (17)$$

In an exemplary embodiment of the present invention, the spatial resolution of the positioning system denotes how close two adjacent targets can be placed without considerable error in their positioning and identification. The spatial resolution is obtained from the limiting case, i.e., when targets are placed in a uniform square configuration. The number of targets is increased in the order of perfect squares and further error for each configuration is checked. The configuration for which this error is maximum (but within a considerable range) is the limiting case and the separation between targets in this configuration gives the spatial resolution.

Figure 12C:
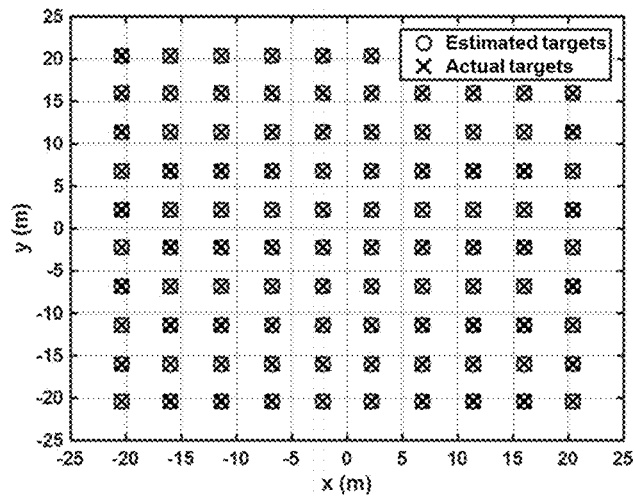
FIG. 12c illustrates positions of the objects in a uniform square configuration with N=100 (10×10) objects, according to an exemplary implementation of the present invention.

The number of wavelengths, w is fixed at 10 which gives a theoretical limit of $N_{max}$=1023 targets. So, the number of targets is increased in steps of perfect squares as N=1, 4, 9, 16, . . . , 961. FIG. 12c shows one such uniform configuration with N=100 (10×10) targets. The simulation parameters used is mentioned in Table III.

TABLE III

System Parameters for Optical Identification Algorithm

| Parameter | Value |
| --- | --- |
| Room Dimensions | 50 m × 50 m × 3 m |
| Transmitter receiver separation, h | 2.15 m |
| Total number of LEDs per panel, $N_{LED}$ | 900 (30 × 30) |
| Number of LED panels | 1600 (40 × 40) |
| Transmitted optical power per LED, $P_{LED}$ | 10 mW |
| Separation between adjacent LEDs | 1 cm |
| LED Lambertian order of emission, m | 4.82 |
| Physical area of detector | 1 $cm^2$ |
| FOV of detector, $\psi_{FOV}$ | 70° |
| Concentrator refractive index, n | 1.5 |
| Grid size | 100 $cm^2$ |
| Physical area of reflector | 10 $cm^2$ |
| Number of wavelengths, w | 10 |

Figure 12D:
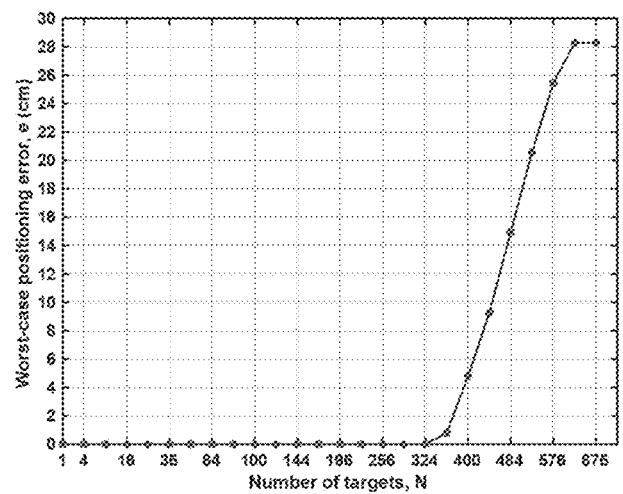
FIG. 12d shows a plot for the worst-case error with respect to the number of targets, according to an exemplary implementation of the present invention.

FIG. 12d shows a plot for the worst-case error with respect to the number of targets. It is observed that, for N=676 (26×26) targets, the error is 28 cm but with any further increase in the number of targets, the error escalates to a very high value (in the order of several meters) which is well beyond the acceptable range. This error escalation occurs because while operating with such large number of targets, a small change in the power peak of one target leads to a cascading effect where the algorithm estimates the position of one target as the actual position of another target and so on. Hence N=676 (26×26) is the limiting case 26 targets can be placed along each dimension of the room which is effectively 45 m due to the practical consideration that the targets shall never be present within a distance of 2.5 m from each of the walls. Therefore, the spatial resolution (distance between two targets) is obtained as 45 m÷26=1.73 m. In other words, objects can be placed 1.73 m away from each other expect the system to work reasonably well. Spatial resolution depends on the room floor dimensions and the grid size (i.e. the spacing between adjacent photodiodes). Thus, the value of spatial resolution obtained above is specific to the configuration simulated, using parameters mentioned in Table III. However, the same procedure can be reliably adopted to determine the spatial resolution of any other practical indoor configuration.

Figure 12E:
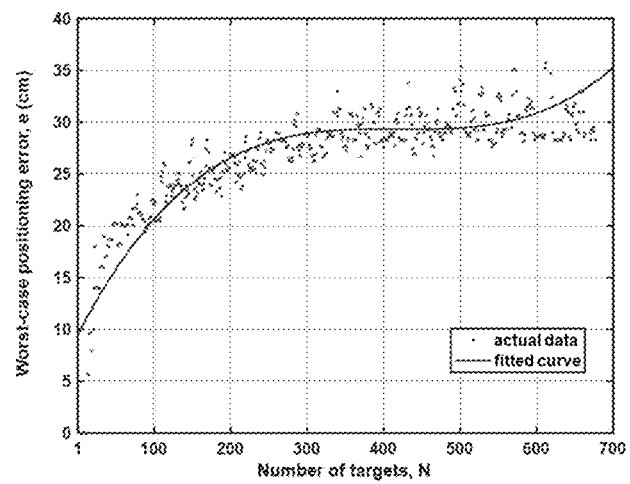
FIG. 12e illustrates a graph depicting an error analysis for the positioning system operated in an indoor environment, according to an exemplary implementation of the present invention.
Figure 12F:
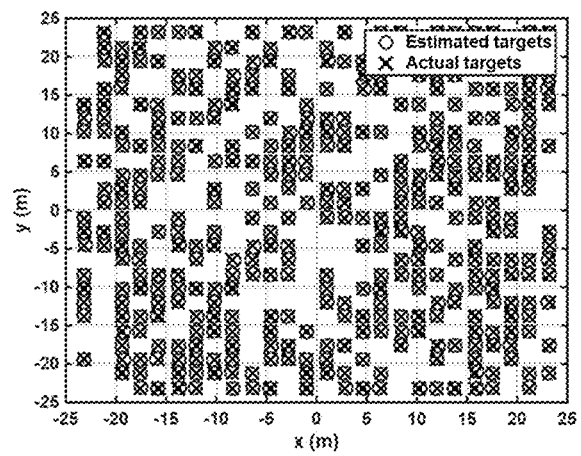
FIG. 12f illustrates actual and estimated positions of N=400 objects placed randomly, according to an exemplary implementation of the present invention.

In an exemplary embodiment of the present invention, FIG. 12e illustrates a graph depicting an error analysis for the positioning system operated in an indoor environment within the spatial resolution of the positioning system. A negligibly small value of positioning error (approximately 10 to 35 cm) is obtained in this case. Error performance is analyzed by placing the targets randomly in this 26×26 uniform configuration. Value of N is varied from 1 to 676. The plot observed in FIG. 12e is the worst-case error for different number of targets. The values plotted in FIG. 12e are averaged over 100 iterations of different random placements of targets in the grid. For example, consider a particular number of targets, say N=400. These 400 targets are placed at positions chosen randomly out of the 676 possible locations and the value of the worst-case error is obtained. This process is repeated for 100 random placements of the same 400 number of targets and the error value is obtained in each case. Finally, the average of all these error values is taken and reported as the error corresponding to N=400. The actual and estimated positions for N=400 targets are shown in FIG. 12f. In this way, the error for all values of N from 1 to 676 is obtained.

Figure 13:
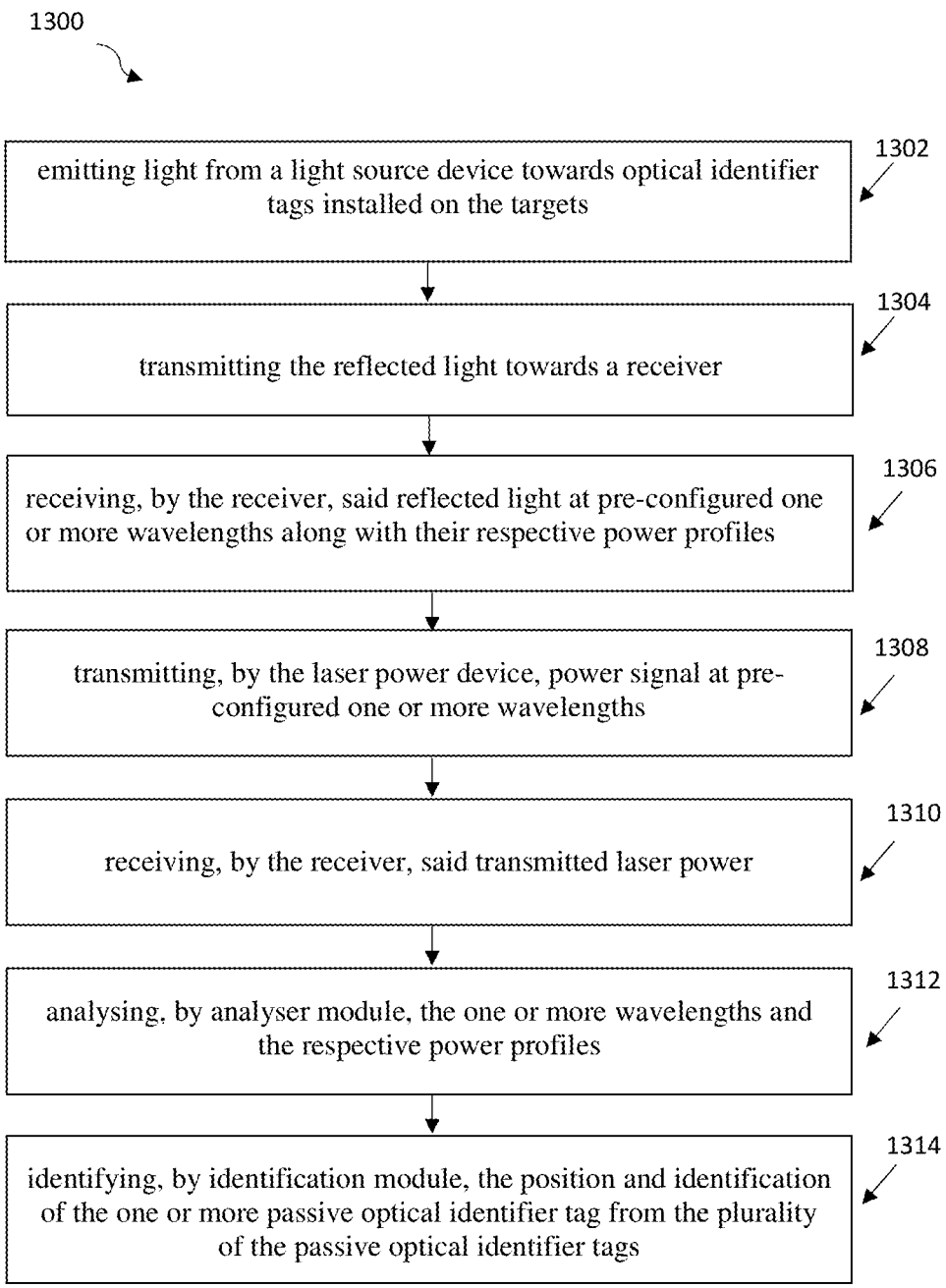
FIG. 13 illustrates the flow-chart of a method for identifying a one or more passive optical identifier tag from plurality of the passive optical identifier tags, according to an exemplary implementation of the present invention.

FIG. 13 illustrates a method for identifying the one or more passive optical identifier tag from plurality of the passive optical identifier tags, according to an exemplary implementation of the present invention.

Referring now to FIG. 13 which illustrates a flowchart (1300) of a method for identification of passive optical identifier tags in an associated environment, according to an exemplary implementation of the present invention. The flow chart 1300 of FIG. 13 is explained below with reference to FIG. 1 as described above.

At step 1302, emitting light from a light source device towards optical identifier tags installed on the targets.

At step 1304, transmitting the reflected light towards a receiver.

At step 1306, receiving, by the receiver, said reflected light at pre-configured one or more wavelengths along with their respective power profiles.

At step 1308, transmitting, by the laser power device, power signal at pre-configured one or more wavelengths.

At step 1310, receiving, by the receiver, said transmitted laser power.

At step 1312, analyzing, by analyzer module, the one or more wavelengths, and the respective power profiles.

At step 1314, identifying, by identification module, the position and identification of the one or more passive optical identifier tag from the plurality of the passive optical identifier tags.

It should be noted that the description merely illustrates the principles of the present invention. It will thus be appreciated that those skilled in the art will be able to devise various arrangements that, although not explicitly described herein, embody the principles of the present invention. Furthermore, all examples recited herein are principally intended expressly to be only for explanatory purposes to help the reader in understanding the principles of the invention and the concepts contributed by the inventor to furthering the art and are to be construed as being without limitation to such specifically recited examples and conditions. Moreover, all statements herein reciting principles, aspects, and embodiments of the invention, as well as specific examples thereof, are intended to encompass equivalents thereof.

We claim:

1. A positioning system for identifying one or more passive optical identifier tag from a plurality of passive optical identifier tags, comprising:
  a light source device configured to emit light towards the plurality of passive optical identifier tags, wherein the plurality of passive optical identifier tags is configured to transmit reflected light;
  a receiver configured to receive the reflected light at pre-configured one or more wavelengths along with their respective power profiles;
  a tunable laser device configured to transmit laser power at pre-configured one or more wavelengths; and
  a processing system coupled with the receiver, the processing system configured to:

analyze the wavelengths and the respective power profiles of the light source, and
identify the position and identification of the one or more passive optical identifier tag from the plurality of passive optical identifier tags.

2. The positioning system as claimed in claim 1, wherein the processing system comprising:
a memory;
a processor coupled to the memory; and
one or more modules, wherein said modules comprises an analyzer module and an identification module, and
wherein the analyzer module is configured to analyze the wavelengths and the respective power profiles of the light source; and
wherein the identification module is configured to identify the position and identification of the one or more passive optical identifier tag from the plurality of the passive optical identifier tags.

3. The positioning system as claimed in claim 1, wherein the light source is installed at an appropriate location to emit the light towards the plurality of the passive optical identifier tags.

4. The positioning system as claimed in claim 1, wherein the plurality of passive optical identifier tags are installed on targets.

5. The positioning system as claimed in claim 4, wherein each of the plurality of passive optical identifier tags reflects a unique set of wavelengths.

6. The positioning system as claimed in claim 5, wherein said unique set of wavelengths is inferred by the corresponding reflection sequence.

7. The positioning system as claimed in claim 6, wherein the reflection sequence of the one or more passive optical identifier tag is a w-bit binary word, where w is number of wavelengths being used for the positioning.

8. The positioning system as claimed in claim 1, wherein each of the plurality of passive optical identifier tags embodies passive reflectors.

9. The positioning system as claimed in claim 1, wherein the receiver comprising:
an optical fiber to pass the laser power;
power splitters to divide and distribute the laser power;
an array of photodiodes to receive the reflected light and the laser power; and
an array of low pass filters to filter out high frequency components and feed output signals to the processor.

10. The positioning system as claimed in claim 9, wherein each of the photodiodes active region is divided into a smaller active region and a larger active region.

11. The positioning system as claimed in claim 10, wherein the smaller active region has pigtail connection to receive input from the optical fiber.

12. The positioning system as claimed in claim 11, wherein the larger active region is configured to receive the reflected light.

13. The positioning system as claimed in claim 9, wherein the optical fiber is connected to the tunable laser, the optical fiber being responsible to pass the laser power towards the array of photodiodes.

14. The positioning system as claimed in claim 9, wherein the tunable laser is configured to be tuned in a cyclic and periodic manner to emit power to the array of photodiodes at pre-configured one or more wavelengths.

15. The positioning system as claimed in claim 9, wherein the power splitters and the arrays of photodiodes are connected with each other by said optical fiber.

16. The positioning system as claimed in claim 15, wherein the power splitters divide and distribute the laser power to the array of photodiodes.

17. The positioning system as claimed in claim 16, wherein the array of photodiodes is configured to receive the laser power and the reflected light along with one or more pre-configured wavelengths.

18. The positioning system as claimed in claim 17, wherein the array of photodiodes is configured to perform optical frequency beating among the frequencies present in the laser power and the received reflected light.

19. The positioning system as claimed in claim 18, wherein the optical frequency beating is configured to produce frequency components and some DC components.

20. The positioning system as claimed in claim 19, wherein the DC components as output signals of the array of the photodiodes are passed through the array of low pass filters.

21. The positioning system as claimed in claim 20, wherein the array of low pass filters filter out the high frequency components and feed the output signals to the processor for analyzing the data to locate and identify the plurality of passive optical identifier tags.

22. The positioning system as claimed in claim 1, wherein power peaks in the power profiles identify the position of the plurality of passive optical identifier tags.

23. The positioning system as claimed in claim 1, wherein the step of identification process of the one or more passive optical identifier tag from the plurality of the passive optical identifier tags comprising:
generating, by said processor, the reflection sequence;
obtaining, by said processor, the reflection sequence, by said processor, by analysing the position of the passive optical identifier tag in different power profiles.

24. A method for identifying one or more passive optical identifier tag from a plurality of passive optical identifier tags, said method comprising:
emitting light from a light source device;
transmitting, by said plurality of passive optical identifier tags, reflected light to a receiver;
receiving, by the receiver, said reflected light at pre-configured one or more wavelengths along with their respective power profiles;
analysing, by analyzer module, the one or more wavelengths and the respective power profiles of the received said light source (130), and
identifying, by identification module, the position and identification of the one or more passive optical identifier tag from the plurality of passive optical identifier tags.

25. The method as claimed in claim 24, wherein the emitting light from the light source being emitted towards the plurality of the passive optical identifier tags.

26. The method as claimed in claim 24, wherein the transmitting reflected light from the passive optical identifier tags is transmitted to the receiver with the unique set of wavelengths.

27. The method as claimed in claim 26, wherein the unique set of wavelengths being inferred by the corresponding reflection sequence.

28. The method as claimed in claim 27, wherein the reflection sequence of the one or more passive optical identifier tag is a w-bit binary word, where w is the number of wavelengths being used for positioning.

29. The method as claimed in claim 24, wherein the receiver comprises an array of photodiodes, wherein said photodiodes configured to receiving the reflected light and laser power.

30. The method as claimed in claim 29, wherein the photodiodes are receiving the reflected light at the pre-configured one or more wavelengths along with their respective power profiles.

* * * * *